Patented May 20, 1941

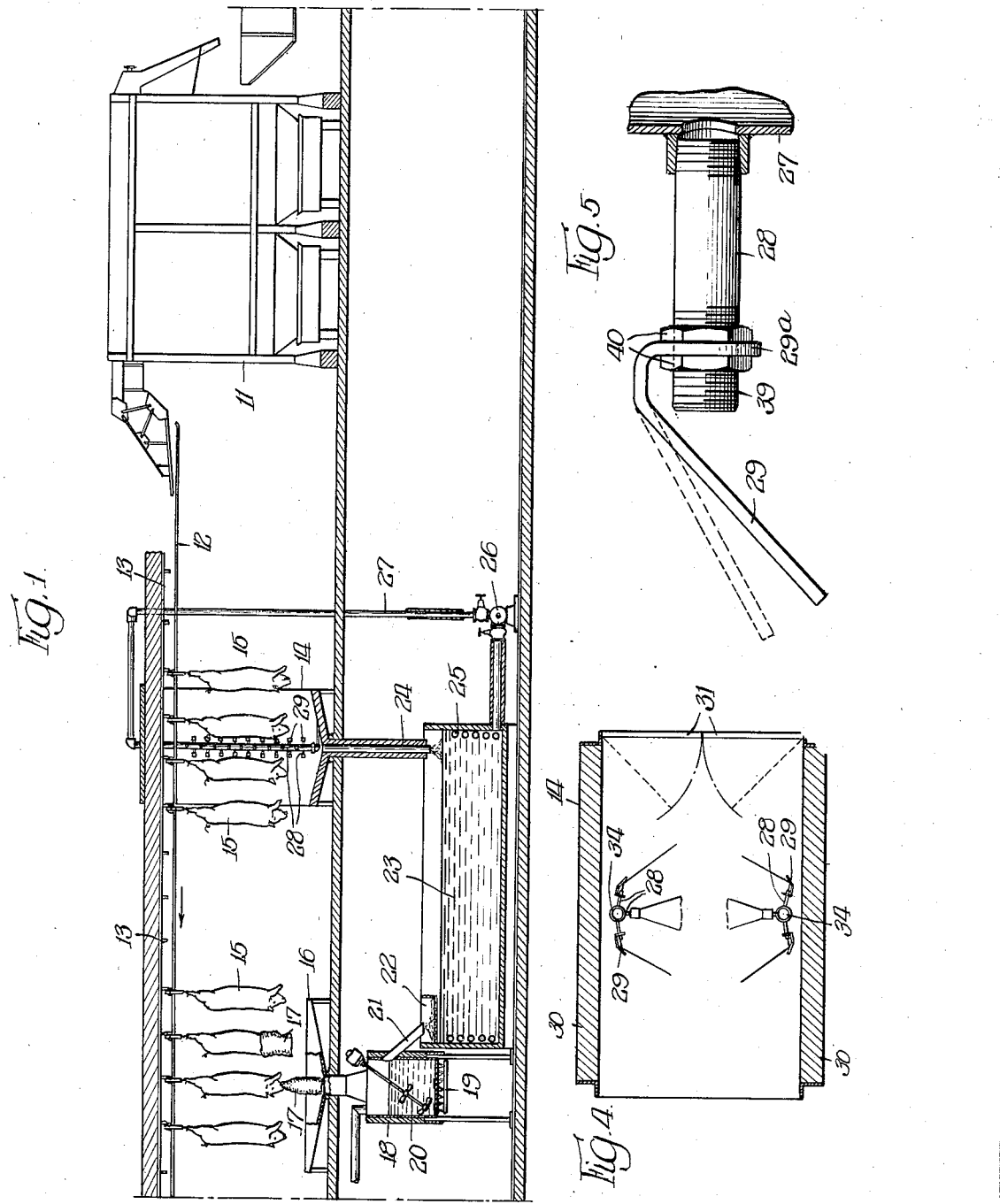

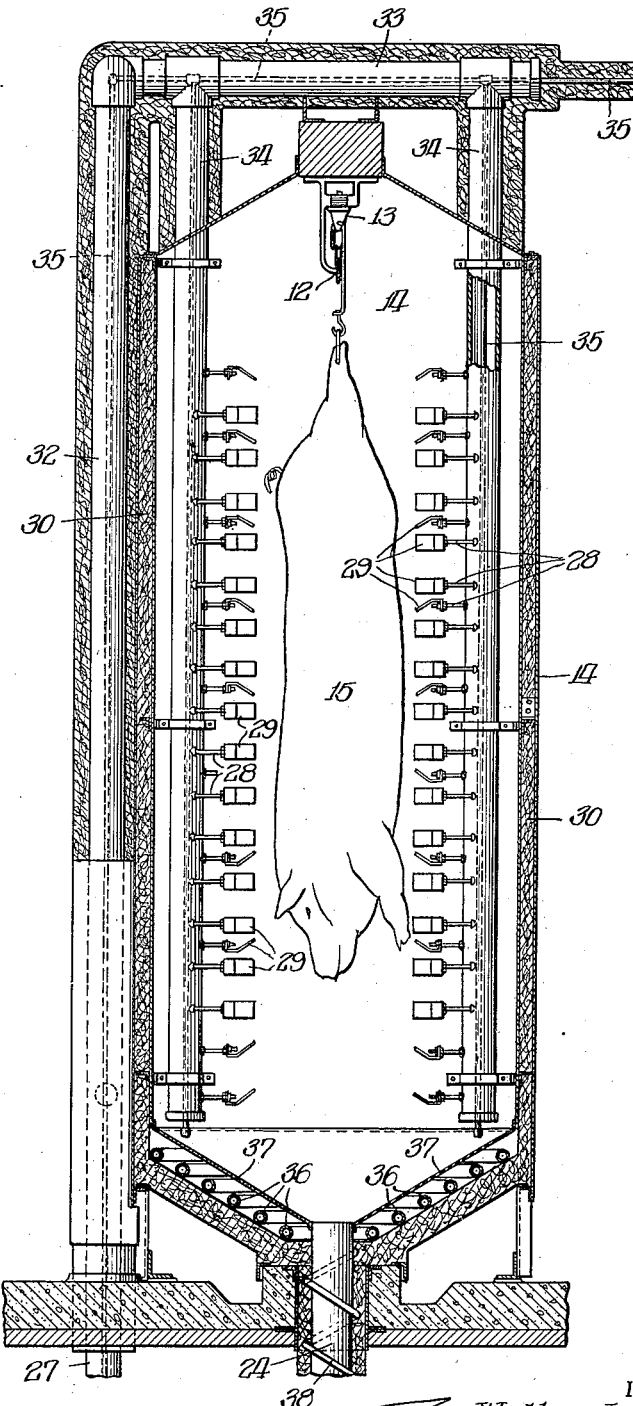

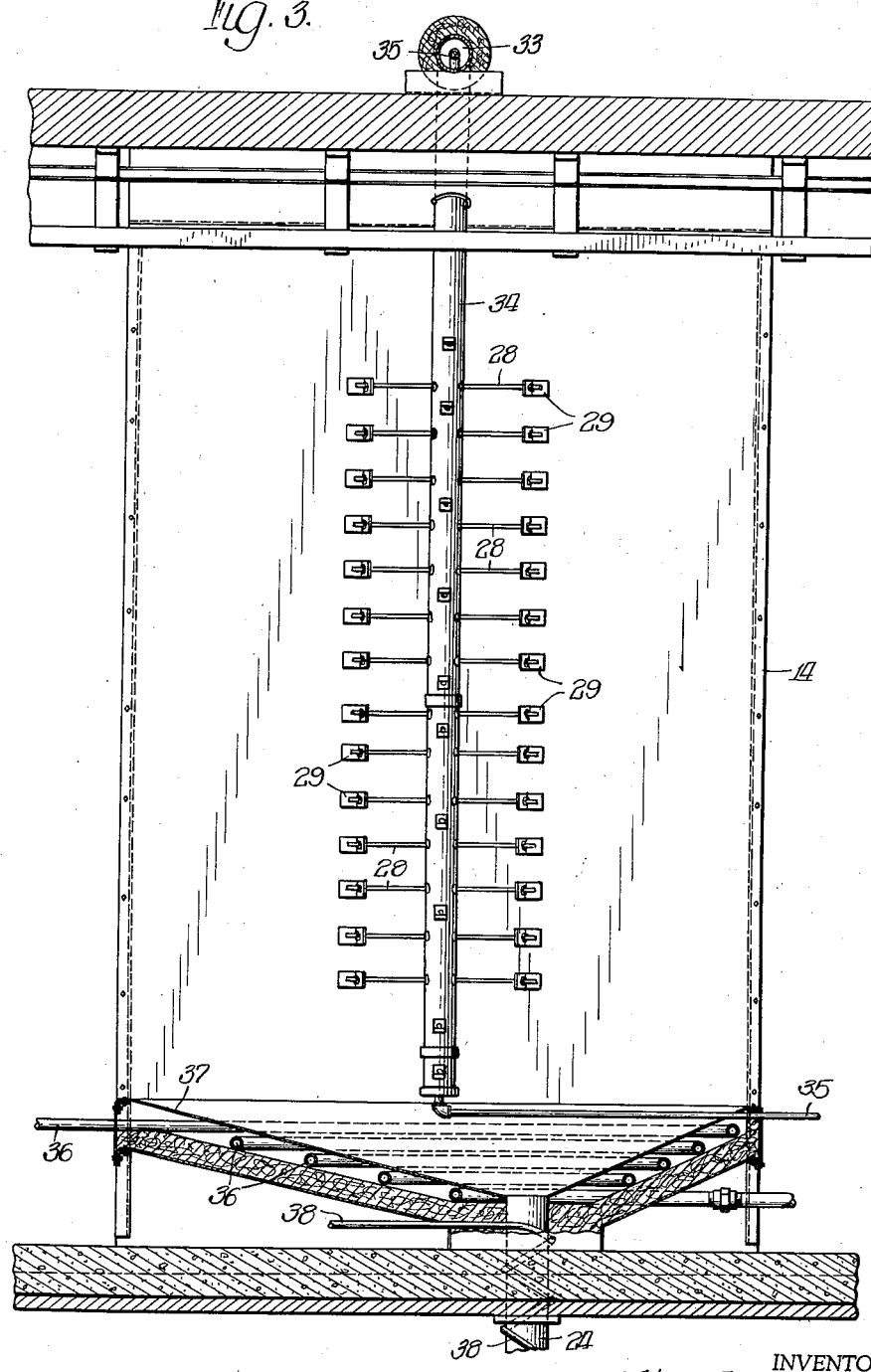

2,242,402

UNITED STATES PATENT OFFICE 2,242,402

APPARATUS FOR DEPILATING FOOD CARCASSES

Walton L. McCaslin, Chicago, Ill., assignor to Armour and Company, Chicago, Ill., a corporation of Illinois Application August 18, 1938, Serial No. 225,506

4 Claims. (Cl. 17—1)

This invention, as hereinafter set forth, pertains to the removal of hair or other growths from food carcasses, of which hogs are typical, by applying a coating of a hot liquid, congealable when cold, and thereafter stripping the congealed coating from the carcass together with the embedded hair. Various compositions have been employed for this purpose including pitch, paraffin and like substances, resin being one of the most popular dominating constituents.

Heretofore the application of the resinous coating has generally been by dipping the carcass into a vat, by brushing and by spraying. The dipping method involves transfer of the carcass from the usual trolley conveyer of the killing rail to the dipping tank and thence to another conveyer, involving time and labor consuming cost, together with liability of dropping and also the necessity of tying the jaws and stopping the nostrils to prevent entrance of the coating substance. The painting procedure has been found to be both slow and ineffective to secure thorough permeation. The spraying method, as heretofore practiced, by which an atomized mixture is applied to the carcass, constitutes a hazard to the operators from breathing the dust-laden air and also results in too quick chilling of the sprayed liquid, which defeats the attempt to obtain thorough impregnation of the hair coat by the composition.

According to the present invention the resinous depilatory in a hot liquid condition is preferably applied as a continuous sheet as distinguished from a spray, whereby the carcass is superficially and uniformly coated throughout by means of flat jets properly positioned and directed in a heated cabinet through which the carcass is being continuously transported on the usual carrier or killing rail; after which coating by overlapping sheets of resinous material the carcass is subjected to a chilling atmosphere at a subsequent stage of the continuous travel whereby the coating is congealed and then stripped from the carcass together with embedded hair. The denuded carcass then proceeds on its way past the inspectors and operators, who cut and prepare for the market, while the stripped congealed coating is remelted, freed from hair and other foreign matter, and made available for re-use.

While the application of the hot liquid composition is preferably applied as a sheet rather than as a spray, yet where the application of this composition is made in a warm atmosphere, as in a cabinet, greatly improved results may be obtained even though the liquid material be applied in the form of a spray as by the use of spray jets.

I have found that in order to render practicable on a large scale this general method of depilation by means of an applied coat of congealable liquid, it is important that handling of carcasses be reduced to a minimum; that the coating substance be liquid at the time of impact and for an appreciable length of time thereafter; that there be isolation of the carcass and coating from normal atmospheric conditions during application to avoid premature chill and to secure uniform coverage and permeation; that there be no necessity of removal from the carrier rail after leaving the scalding and scraping apparatus; and that entry of the resinous composition into the oral and nasal cavities be avoided. By the present invention, as distinguished from prior practice, these objects are obtained as will hereinafter be set forth in detail and specified in the appended claims. A preferred practicable embodiment of apparatus employed is illustrated in the accompanying drawings whereby to facilitate an understanding of the invention and to serve as a basis for the more detailed description which follows.

In the accompanying drawings:

Fig. 1 is a diagrammatic view illustrating the sequence of steps employed in carrying out the improved method of treatment;

Fig. 2 is a transverse vertical section through the treating cabinet;

Fig. 3 is a longitudinal vertical section through the cabinet;

Fig. 4 is a horizontal section through the cabinet on a reduced scale; and

Fig. 5 is a detail view of a preferred form of spreader nozzle.

Having reference first to Fig. 1 of the drawings, reference numeral 11 designates the scalding and preliminary dehairing apparatus of well known type, the features of which form no part of the present invention and require no detailed description. From this apparatus the carcass is hung by the usual gambrel stick upon the killing rail 12 along which it is transported by the engagement therewith of pusher elements of the carrier 13. Thus far the procedure is that in common use in meat killing and processing plants whereby the carcasses travel from the killing floor continuously without interruption along a predetermined route, being presented in succession to the various operatives, each of which performs his particular service, culminating in inspection and ultimate dissection preliminary to marketing.

At 14 is indicated the cabinet through which the carcass 15 is transported and during its uninterrupted passage a coating of liquid resinous composition is applied in sheets whereby the entire surface of the carcass is flooded with the liquid. Leaving the coating cabinet the carcass passes through an area of reduced temperature, whether atmospheric or artificially cooled, and reaches a position above the reclamation hopper 16. By this time the resinous coating has congealed to such an extent that it may be downwardly stripped from the carcass as indicated at 17 and dropped together with embedded hair into the remelting vat 18 heated by steam jets 19 and containing motorized stirring paddles 20. From the vat 18 the reliquefied substance overflows at 21 into the strainer basket 22 by which contained hair and other foreign matter are removed and then flows into the reservoir 23, where, together with the waste from the coating cabinet 14 entering at 24, it is reheated by suitably disposed steam pipes 25 and then forced by the pump 26 through the pipes 27 into the treating cabinet 14 and the spreader nozzles for flooding the carcasses 15 passing therebetween.

Turning now to the other figures of the drawings for a more detailed explanation of the coating cabinet and accessorial members for flooding the carcass with the resinous composition, it will be observed that the cabinet is positioned along the killing rail 12 and carrier 13 beyond the scalding apparatus 11 and houses in its upper portion a section of the rail. The cabinet 14 with heat insulated walls 30 is advantageously of oblong cross section, the major axis corresponding to that of the carrier, and, where used with hogs, having appropriate inner dimensions of, say, 2′3″ x 3′6″ whereby to pass the carcass closely adjacent the flooding nozzles 28 and their spreaders 29, thus minimizing any tendency towards a breaking up of the liquid sheets before impingement.

At the entrance to the cabinet 14 there are advantageously provided inwardly swinging self-closing doors 31 (Fig. 4) for which fabric curtains may be utilized. In some cases closures may be omitted, as the carcasses themselves, upon entering and passing through the cabinet, serve to substantially close this passage to drafts. The sheets of hot liquid within the cabinet serve to impart an elevated temperature to the atmosphere all about the carcass and the enclosure formed by the cabinet serves to maintain this atmosphere at the elevated temperature.

The molten resinous composition is forced by the pump 26 from the reservoir 25 upwardly through the riser pipe line 32 to the header 33 and thence downwardly into the branch manifold pipes 34, from which it is discharged from the series of nozzles 28, being flattened into sheets by the spreaders 29.

Steam pipes 35 axially disposed within the riser 32, the header 33 and the manifolds 34 serve to maintain the liquid composition at the proper temperature for flooding the carcasses, while the cabinet interior is heated to approximately the same temperature by the steam pipes 36 upon the hopper-shaped bottom wall 37 of the cabinet. These latter pipes also serve to keep the waste composition in liquid condition for drainage into the reservoir 23 through the drain 24, which is also heated by steam pipes 38.

It is important that every part of the carcass surface be flooded by the resinous liquid from the nozzles 28, wherefore the spreaders 29 are adjustable not only as to degree of angle to the nozzle axis but also rotatably about said axis. The blade of the spreader, being of sheet metal, can be bent easily as indicated in Fig. 5 to vary its inclination and its shank 29ᵃ can be rotated about the nozzle with which it has threaded engagement at 39, lock nuts 40 serving to secure the same in adjustable position.

Furthermore, it has been found advantageous to provide three vertical series of spaced nozzles on the manifolds 34, the nozzles of the several series branching in divergent directions as best shown in Fig. 4; the major portion of the spreaders on the two outer series adjusted to project sheets of liquid in vertical planes with perhaps the uppermost and lowermost spreaders adjusted to project the liquid downwardly and upwardly respectively, in planes inclined to the horizontal. On the other hand, spreaders of the medial or intermediate series are advantageously adjusted to project the liquid in planes inclined to the horizontal, those of the upper half downwardly and those of the lower half upwardly. The result is that every portion of the carcass is flooded, the face, the buttocks, beneath the legs, etc.

The operation of the apparatus in the practice of depilation will be readily understood. The carcasses moving continuously and in succession along the killing rail push inwardly the entrance closure to the cabinet and pass between the spreaders by which they are flooded with the liquid resinous composition. Leaving the cabinet the carcasses traverse a cooling area during which the resinous coating cools and is thereafter stripped downwardly into the reclamation hopper while the depilated carcass passes on for inspection and cutting. The stripped coating is remelted, strained, and together with the waste from the treating cabinet reheated, pumped from the reservoir to the manifolds and again flooded upon other carcasses—all in cycle.

I claim:

1. An apparatus for depilating animal carcasses comprising a cabinet, means for conveying the carcasses continuously with their head portions lowermost, a conduit system for carrying liquid coating material into said cabinet and adjacent said carcasses as they pass there-through, nozzles connected with said system and equipped with spreaders arranged to project substantially vertical sheets of coating material onto said carcasses, and nozzles connected with said system and equipped with spreaders arranged to project sheets of coating material in generally horizontal planes, said last-mentioned nozzles being positioned to direct coating material against the head portion of the carcasses.

2. An apparatus for depilating animal carcasses comprising a cabinet, means for conveying the carcasses continuously through said cabinet with their head portions lowermost, a conduit system for carrying liquid coating material into said cabinet and adjacent said carcasses as they pass therethrough, nozzles connected with said system and equipped with spreaders arranged to project sheets of coating material in generally vertical planes onto said carcasses, and nozzles connected with said system and equipped with spreaders arranged to project sheets of liquid coating material in planes inclined with the horizontal so as to direct the liquid material laterally and upwardly against the head portions of the carcasses.

3. Apparatus as called for in claim 2 in which said last-mentioned nozzles are positioned below the carcasses and equipped with spreaders arranged to project the liquid coating material in planes inclined with the horizontal, so as to direct the liquid material upwardly against the head portion of the carcasses.

4. An apparatus for depilating animal carcasses comprising a carbinet, means for conveying the carcasses continuously through said cabinet with their head portions lowermost, a conduit system for carrying liquid coating material into said cabinet and adjacent said carcasses as they pass therethrough, nozzles connected with said system and equipped with spreaders arranged to project sheets of liquid coating material in generally vertical planes onto said carcasses, and nozzles connected with said system and equipped with spreaders arranged to project sheets of coating material in planes inclined with the horizontal, some of said last mentioned nozzles being positioned above the main portion of said carcasses and having spreaders arranged to project coating material at a downward inclination against the hind legs of the carcasses and some of said last mentioned nozzles being positioned below the main portion of said carcasses and having spreaders arranged to project coating material at an upward inclination against the head portion of the carcasses.

WALTON L. McCASLIN.